F. GREENLAND.

MAT.

No. 10,889. Reissued Dec. 20, 1887.

Witnesses:
Charles R. Searle,
H. A. Johnstone.

Inventor:
Frank Greenland
by his attorney
Thomas Drew Stetson

N. PETERS, Photo-Lithographer, Washington, D. C.

UNITED STATES PATENT OFFICE.

FRANK GREENLAND, OF BROOKLYN, NEW YORK.

MAT.

SPECIFICATION forming part of Reissued Letters Patent No. 10,889, dated December 20, 1887.

Original No. 343,308, dated June 8, 1886. Application for reissue filed November 15, 1887. Serial No. 255,263.

*To all whom it may concern:*

Be it known that I, FRANK GREENLAND, mat-manufacturer, residing in Brooklyn, Kings county, in the State of New York, have invented certain new and useful Improvements in the Construction of Mats, of which the following is a specification.

The improved mat may be of manila or analogous material, with or without a pile on the upper surface. The invention relates to the border.

It has long been common to border mats with a braid of the same or a different material secured by stitching. It is difficult to thus secure the marginal braid. The joining of the ends, whether abutting or overlapping, is unsightly. I employ a similar marginal braid, but secure it with facility and permanence by metallic fastentngs. I inclose the ends in a sheet-metal tube peculiarly formed and adapted to also receive metal fastenings. I insert through the tube a long staple adapted to serve as an eye, by which the mat may be chained when it is necessary to thus secure it, as for vestibule door-mats in houses in cities. The staple thus secured constitutes a specially strong and tasty eye for this purpose.

The accompanying drawings form a part of this specification and represent what I consider the best means for carrying out the invention.

Figure 1:
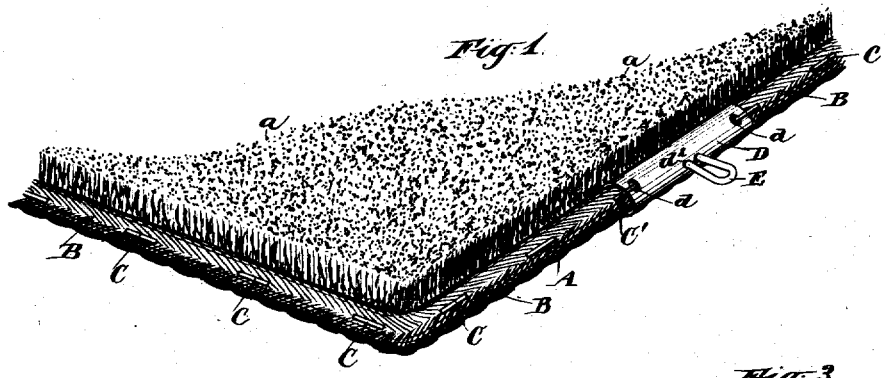
Figure 2:
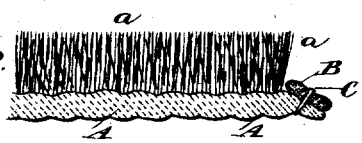
Figure 3:
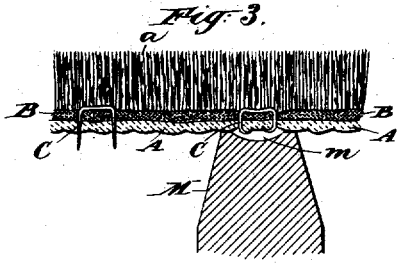
Figure 5:
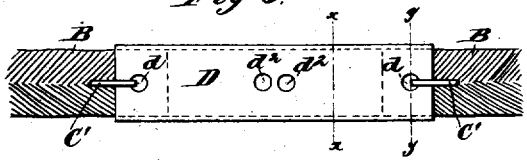
Figure 6:
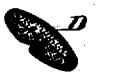
Figure 7:
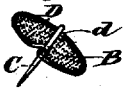
Figure 4:
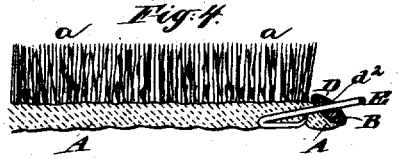
Figure 8:
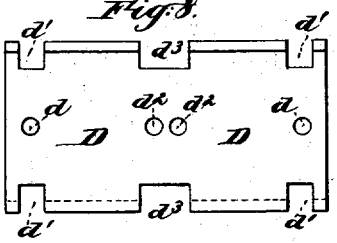
Figure 9:
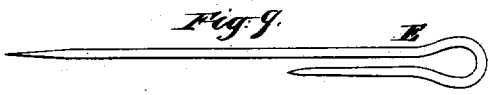

Figure 1 is a perspective view of a portion of a finished mat. Figs. 2 and 3 are vertical sections showing the mode of attaching the braid on the edge. Fig. 4 is a section corresponding to Fig. 2, and shows the mode of attaching the fastening-staple. Fig. 5 is a face view of the flattened tube. Fig. 6 is a section on the line *x x* in Fig. 5. Fig. 7 is a section on the line *y y* in Fig. 5. Fig. 8 is a plan view of the blank which forms a tube. Fig. 9 is a plan view of the fastening-staple detached.

Similar letters of reference indicate corresponding parts in all the figures.

A is the body of the mat, and *a* pile or tuft thereon. A narrow space along the edge of the body A is formed without tufting, or the tufting is sheared off or otherwise removed.

B is a sufficient length of braid, of manila or other suitable material, extending around the mat and partly superposed upon the edge thereof.

C C′, &c., are staples of Swede iron or other tough iron coated with zinc, tin, or other protecting material. These staples are formed with their legs parallel, and are driven in an inclined direction through the braid and through a portion of the mat. For this operation the mat is held on an anvil, M, presenting a surface, *m*, adapted to receive the points of the staples and clinch them firmly together.

The ends of the braid B are embraced within a splicing shell or tube, D, of brass or soft iron, which is flattened after its application, so as to compress the lapped ends firmly together. This tube D is formed from a suitable piece of sheet metal perforated and notched, as will be presently described. It is locked around the braid by its edges being hooked together. Holes *d* near each end receive each one leg of a staple, C′. Notches *d′*, previously formed in the edges of the metal, provide liberal openings for the staple to pass through and take hold of the body A of the mat and clinch therewith, like the other staples, C. The staples thus applied engaging each on one end of the tube D should be a little longer than the other staples. They may be clinched by the same means.

Two holes, $d^2$, near the mid-length of each tube receive the legs of a staple, E. One leg of this staple is longer than the other. Both extend quite across through the tube and into the body of the mat A. Notches $d^3$, formed in the edges of the metal before the tube is formed, provide liberal apertures for this staple to pass through on the back side. The short leg of the staple E is bent so as to spread a little in the material of A and aid to hold therein. The longest leg of E extends a good distance inward in the body A, but finally extends out at the bottom, and is bent and clinched, as shown in Fig. 4.

The tube D may be silvered, nickeled, or otherwise coated. It may be stamped, engraved, or otherwise made to carry the name of the owner. This may be important in places where the mat is liable to be misplaced by accident or design. I propose to stamp or otherwise produce thereon not only the date of the patent, but also the address of the manufacturer or principal agent.

Modifications may be made in many or all of the details. The ends of the braid B may abut together either squarely or diagonally, or they may be lapped upon each other. All the staples may be of brass. The several staples may be set by machinery.

Parts of the invention may be used without the whole. The staple E may be like the staples C, except in increased length. It may be clinched in a similar manner by driving against an anvil, M. The widening or eye at the bight of the long staple E may be omitted, and there may be sufficient width between the parallel parts of the staple to allow the engagement of a chain. (Not represented.) I prefer all the parts as shown.

I claim as my invention—

1. In a door-mat, a border, B, of flexible fibrous material, having its ends united and protected by a sheet-metal covering, substantially as herein specified.

2. The tube D, formed of sheet metal, with its edges locked together and provided with perforations, as shown, in combination with the edging B and mat-body A, and suitable connecting-fastenings, substantially as herein specified.

3. The long staple E, adapted to engage with a chain, in combination with a mat, A, edging B, splicing-tube D, and staples C′, as herein specified.

In testimony whereof I have hereunto set my hand, at New York city, this 9th day of November, 1887, in the presence of two subscribing witnesses.

FRANK GREENLAND.

Witnesses:
H. A. JOHNSTONE,
M. F. BOYLE.